United States Patent
Clawson

[11] 3,894,520
[45] July 15, 1975

[54] CHARGE FORMING DEVICE WITH FUEL VAPORIZATION

[75] Inventor: Lawrence G. Clawson, Dover, Mass.

[73] Assignee: Thermo Electron Corporation, Waltham, Mass.

[22] Filed: Mar. 13, 1974

[21] Appl. No.: 450,644

[52] U.S. Cl......... 123/32 ST; 123/32 SP; 123/75 B; 123/191 S; 123/191 SP; 123/122 A
[51] Int. Cl............................................. F02b 3/00
[58] Field of Search........... 123/32 ST, 32 SP, 75 B, 123/191 S, 191 SP, 122 A

[56] References Cited
UNITED STATES PATENTS

| | | | |
|---|---|---|---|
| 970,153 | 9/1910 | Winand | 123/75 B |
| 1,519,516 | 12/1924 | Stryper | 123/122 A |
| 1,534,290 | 4/1925 | Udale | 123/122 A |
| 2,011,992 | 8/1935 | Aseltime | 123/32 SP |
| 2,191,638 | 2/1940 | Adams | 123/191 SP |
| 3,608,531 | 9/1971 | Baxendale | 123/119 A |
| 3,633,553 | 1/1972 | Holzapfel | 123/119 A |
| 3,682,151 | 8/1972 | Tatsutomi | 123/119 A |

*Primary Examiner*—Charles J. Myhre
*Assistant Examiner*—R. H. Lazarus
*Attorney, Agent, or Firm*—James L. Neal

[57] ABSTRACT

An internal combustion engine is adapted to permit combustion of heavy liquid hydrocarbon fuels. The fuel is vaporized prior to combustion in the engine cylinder by heat rejected from the engine's exhaust manifold prior to the entry into the intake manifold. In one embodiment a fuel line enters the exhaust manifold and feeds into a cross-over tube which extends from the exhaust manifold into the intake manifold. Exhaust gases enter the cross-over tube through a gap between the two tubes and mixes with the fuel from the fuel line. In a second embodiment the fuel line intersects at the cross-over tube between the exhaust and intake manifolds. Exhaust gases from the exhaust manifold mix with the fuel in the cross-over tube.

8 Claims, 4 Drawing Figures

1

CHARGE FORMING DEVICE WITH FUEL VAPORIZATION

BACKGROUND OF THE INVENTION

Some liquid fuels, especially heavy liquid hydrocarbon fuels, are best combusted if injected under pressure with air directly into the engine cylinder or if vaporized prior to combustion. Fuel injection systems tend to be large and expensive. On the other hand, in some applications, a vaporization system provides a compact and inexpensive fuel introductory system.

This invention pertains to internal combustion engines and particularly to pre-chamber internal combustion engines designed to burn heavy liquid hydrocarbons. An object of this invention is to provide a simple, inexpensive fuel supply means to facilitate the burning of heavy liquid hydrocarbons in an internal combustion engine by vaporizing the fuel prior to combustion. Another object of this invention is to convert conventional spark-ignition engines to heavy fuel engines with little expense and without major redesign of the engine. A further object of this invention is to provide a fuel system for mixing fuel directly with combustion products without the formation of deposits in the mixing zone. Another object of this invention is to provide a fuel system for vaporizing fuel prior to introduction to an expansion chamber and which minimizes both fuel condensation subsequent to vaporization and premature fuel ignition.

SUMMARY OF THE INVENTION

In the fuel system of this invention, exhaust gases are mixed with fuel just before the fuel enters the intake manifold so that upon entry into the intake manifold and before introduction into the combustion chamber the fuel is entirely vaporized. As power requirements increase and more fuel is required, more heat is generated by the combustion process and sufficient heat is available to vaporize the fuel. Further, due to the relationship of heat production and fuel requirements, the temperature of vaporized fuel is maintained nearly constant throughout the operating range of the engine.

In one embodiment of the system, the fuel line passes into the exhaust manifold. Within the exhaust manifold the fuel line feeds fuel into a cross-over tube which has a larger diameter than the fuel line and extends from the exhaust manifold to the intake manifold. This cross-over tube surrounds and overlaps the fuel line. Due to the relatively high pressure within the exhaust manifold, the exhaust gases enter the fuel line at the junction of the fuel line and the cross-over tube and pass to the intake manifold. Heat from the exhaust products vaporize fuel as it travels along the cross-over tube. The fuel line and cross-over tube are selected to provide a mix that produces the desired balance between vapor temperature and fuel flow rate without undue introduction of exhaust gases with the inlet manifold.

In another embodiment of the system, the fuel line intersects a cross-over tube extending from the exhaust manifold to the intake manifold and again, because of the relatively higher pressure of the exhaust manifold, exhaust gases pass from the exhaust manifold to the intake manifold. The fuel mixes with the exhaust gases within the cross-over tube and is vaporized therein by the exhaust gases.

This invention is particularly compatible with a pre-chamber engine of the type disclosed in U.S. Pat. No. 3,824,965 filed May 30, 1972. A fuel supply system supplies fuel to the main combustion chamber through the fuel line as a function of engine load and the fuel supply system supplied fuel to a pre-chamber as an inverse function of the engine load. A fuel pump continuously maintains a low fuel supply pressure substantially constant with respect to engine crank angle, throughout the entire fuel supply system, but above the air supply pressure. The fuel entering the fuel line is neither carbureted nor injected. During engine start-up, the engine may run, at idle conditions, on the pre-chamber charge alone. The initial exhaust gases are usable to vaporize fuel in the cross-over tube destined for the main combustion chamber. Thereafter, the fuel supply, exhaust manifold temperature and pressure and thus the volume of exhaust flow through the cross-over tube all increase as a result of increase in engine load so that a balance of these variables is maintained. This balance assures the desired evaporation of the fuel passing through the cross-over tube regardless of flow rate without undue admission of exhaust gases to the intake manifold.

BRIEF DESCRIPTION OF THE DRAWINGS

FIG. 3 is a detailed view of an element of FIG. 1.

DETAILED DESCRIPTION OF THE DRAWINGS

Figure 1:
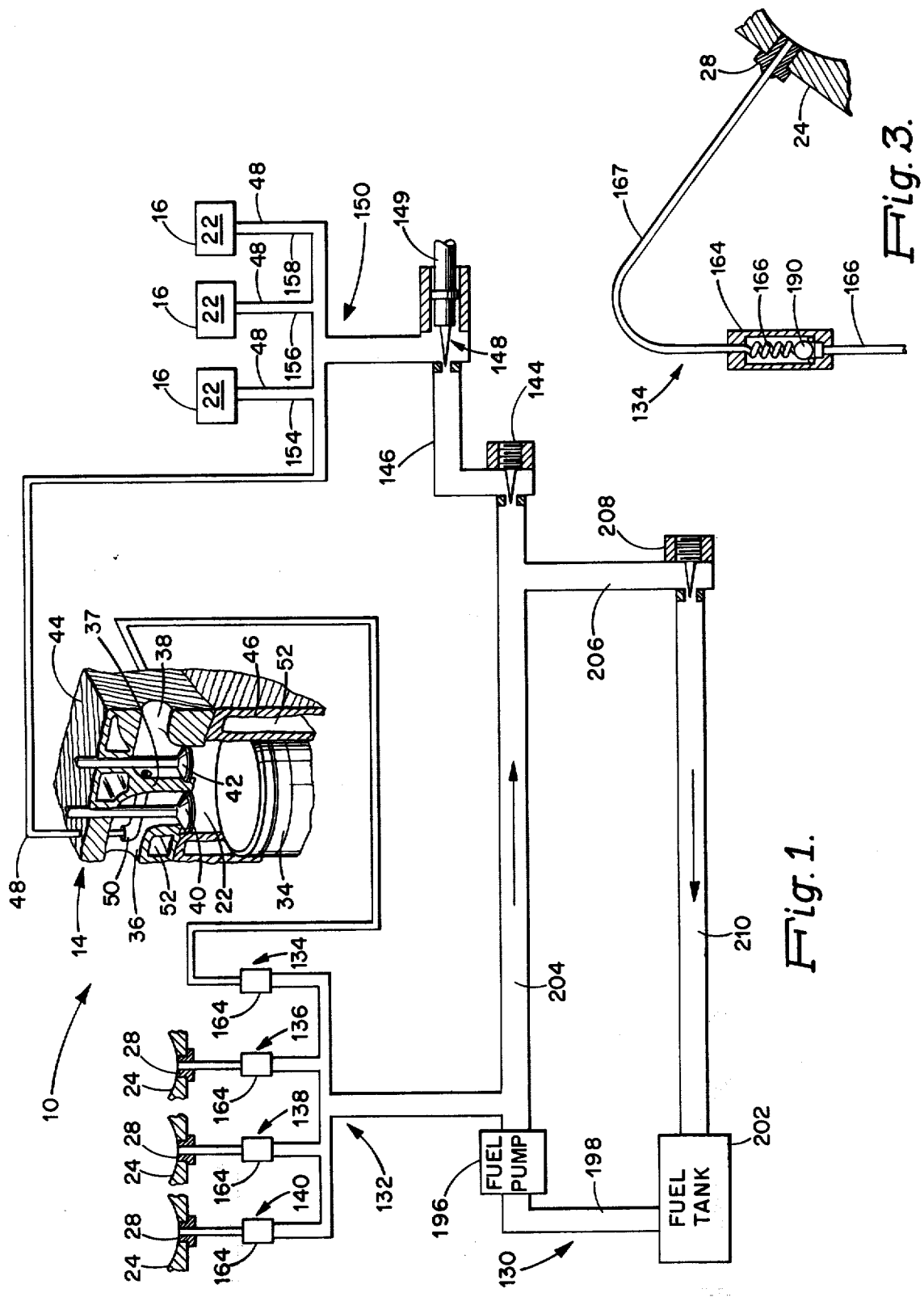
FIG. 1 illustrates a schematically preferred embodiment of a fuel system comprising a charge forming device constructed according to this invention.
Figure 2:
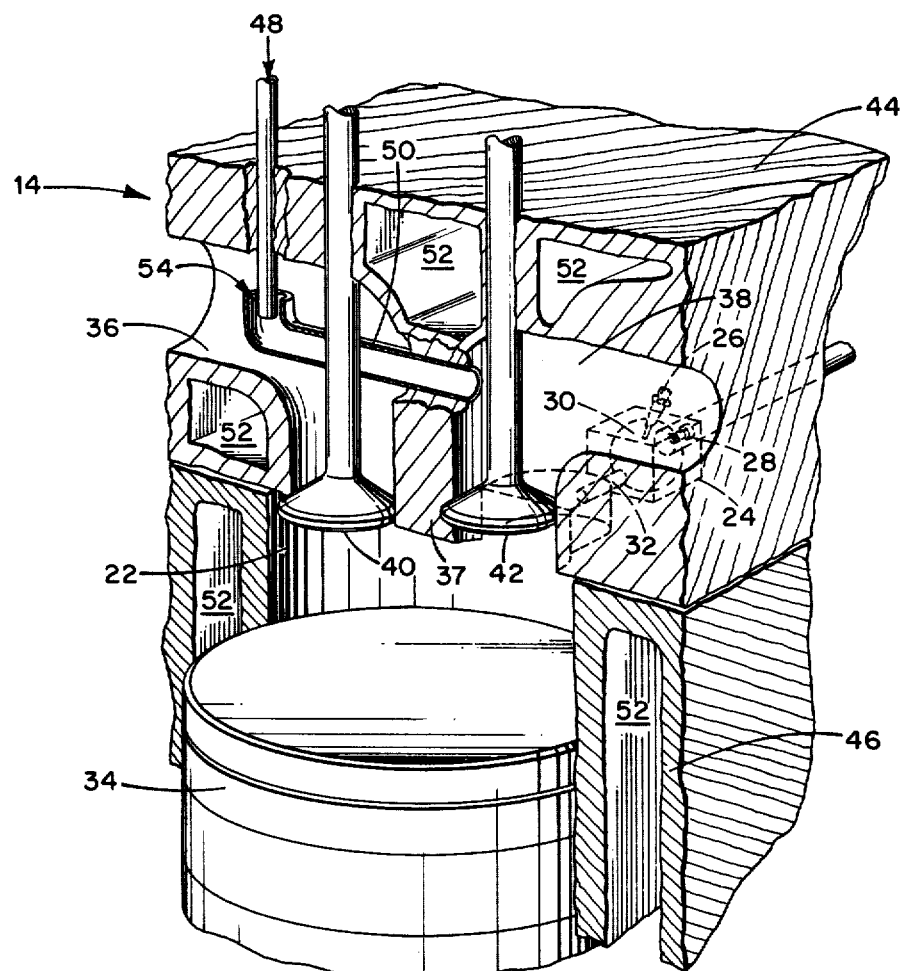
FIG. 2 is a cut-away view illustrating a preferred embodiment of the charge forming device.

Referring to FIGS. 1 and 2, which depict a preferred embodiment of this invention, an internal combustion engine 10, includes a fuel supply system 12 and cylinders 14, 16, 18, 20. Each cylinder is identical to the cylinder 14 depicted in FIG. 1 and FIG. 2. Like numbers designate like parts. The illustrated preferred embodiment is essentially an improvement of the engines described in U.S. Pat. No. 3,508,530 and U.S. Pat. No. 3,824,965.

Referring to FIG. 2, each cylinder of the internal combustion engine 10 contains a main cylinder or combustion chamber 22 and pre-chamber means 24. The pre-chamber means 24 includes an ignition means 26 which may be either a spark plug or a glow plug, a pre-chamber fuel nozzle 28 for injecting fuel from the fuel supply system 12 into a combustion chamber 30, and a fluid passage 32 communicating with the main combustion chamber 22 to allow burning fuel from the pre-chamber means 24 to ignite fuel in the main combustion chamber 22. The chamber 30 is preferably sufficiently large to burn an amount of fuel necessary to keep the engine running under idling conditions and to handle the charge necessary to ignite the fuel charge in the main combustion chamber 22. A substantially spherical shape for the chamber 30 is preferred, since it provides a minimum surface to volume ratio.

Each cylinder 22 also contains a reciprocating piston 34, an exhaust manifold 36, an intake manifold 38, a partition separating manifolds 36 and 38, exhaust valve 40, an intake valve 42, a manifold housing 44, a cylinder housing 46, a fuel line tube 48 carrying fuel from the fuel supply system 12 to the exhaust manifold 36, a cross-over tube 50, extending through the partition 37 for carrying fuel and exhaust gases from the exhaust manifold to the intake manifold housing 44, and passages 52 for circulating cooling water around the cylinder housing 46. The exhaust manifold 36 accepts combustion gases from the main combustion chamber 22 through the exhaust valve 40 during the scavenging portion of the cycle and exhausts them. The intake manifold 38 accepts air from an external source, mixes it with vaporized fuel, and channels the resulting mixture through the intake valve 42 and into the main combustion chamber 22. Both the intake manifold 38 and the exhaust manifold 36 may be as described in U.S. Pat. No. 3,508,530. The exhaust manifold pressure is greater than the pressure within the intake manifold 38 during operation of the engine. For example, high pressure exhaust gases present in the exhaust manifold 36, may be at a pressure of about 4 psi above atmospheric pressure while the intake manifold 38 contains air and vaporized fuel at pressures ranging from nearly atmospheric pressure of ¾ atmospheric pressure. The cross-over tube 50 tends to have a limited equalizing effect. Pressure difference is maintained, since, as will be discussed later, the small inside diameter of the cross-over tube 50 and the presence of fuel within the cross-over tube 50 restricts the amount of exhaust gases that will flow into the intake manifold 38.

Referring to FIG. 2, the fuel line tube 48 is quite small and in one embodiment has an inside diameter of about 0.027 inches. The fuel line tube 48 enters the exhaust manifold 36 from a direction other than that from which the exhaust gases enter the exhaust manifold 36. The fuel line tube 48 extends into and communicates with the cross-over tube 50 at a junction 51 within the exhaust manifold 36 to form a single conduit system to conduct fuel from the fuel supply system 10 to the intake manifold 38. The cross-over tube 50 has an inside diameter greater than the outside diameter of the fuel line tube 48. In the one embodiment mentioned above, this inside diameter of the cross-over tube 50 is 0.200 inches, while the outside diameter of the fuel line tube is 0.125 inches. The fuel line tube extends for a distance into the cross-over tube 50, said distance being sufficiently to prevent any fuel from escaping into the exhaust manifold 36. A gap 54 exists between the cross-over tube 50 and the fuel and the fuel line tube 48. The cross sectional area of the gap 54 is determined for each engine design to limit exhaust gases entering cross-over tube 50 substantially those necessary to vaporize the fuel.

The cross-over tube 50 extends from its junction with the fuel line tube 48 in the exhaust manifold 36 through the partition 37 in the engine block laterally into the intake manifold 38. Fuel admitted to the cross-over tube 50 flows slowly in a thin stream or in droplets from the fuel line tube 48. The prevailing liquid head established in the fuel supply system 12 provides little force at the junction 51. Consequently, since the cross-over tube 50 is nearly horizontal under normal operating conditions, the fuel pressure in the cross-over tube 50 is negligible. The pressure difference between the exhaust manifold 36 and the intake manifold 38 creates a flow of exhaust gases there-across and is instrumental in transporting the fuel from the fuel line tube 48 into the intake manifold 38. In the apparatus of FIG. 1, the fuel line tube 48 and cross-over tube 50 are positioned so that fuel flow is enhanced by the force of gravity.

Referring to FIG. 2, the operation of this embodiment will be described. The engine 10 is operated by injecting fuel from the fuel supply system 12 into the prechamber 24 through the nozzle 28. This fuel is combined with air from the main combustion chamber 22 which is present in the prechamber 24, and ignited by the ignition means 26. Exhaust gases from prechamber 24 are jetted into the main combustion chamber 22 for producing combustion therein. The resulting exhaust gases are discharged into manifold 36 through valve 40.

When used in conjunction with a pre-chamber engine 10, of the type described above heavy hydrocarbon fuel is first fed to the pre-chamber means 24 during start-up conditions. The fuel is ignited using air from the main combustion chamber 22. The engine 10 may then idle on its pre-chamber means 24 until the passage of a brief interval in which the exhaust gas temperature is raised sufficiently to vaporize the incoming fuel to the main combustion chamber 22. The engine may also be permitted to idle by activating only the pre-chamber means 24 during no-load conditions.

Fuel enters the fuel line tube 48 from the fuel supply system 12. The fuel is under relatively low line pressures, and in this embodiment, a line pressure of about 20 psi is used. The fuel in liquid form enters the exhaust manifold 36 within the fuel line tube 48 and trickles from the fuel line tube 48 and into the cross-over tube 50. Simultaneously, exhaust gases from the exhaust manifold 36 enter the cross-over tube 50 through the gap 54. Since the exhaust manifold 36 is characterized by higher pressures than the intake manifold 38, a flow of exhaust gases from the exhaust manifold 36 into the cross-over tube 50 is assured during operation of the engine 10. Exhaust gases in the cross-over tube 50 mix with the fuel in the tube 50 to heat the fuel to vaporization as it passes through the tube 50. The flow of exhaust gases carries the fuel and gaseous mixture together into the intake manifold 38, at which time most of the fuel has been vaporized by heat transferred from the gases to the fuel. Any remaining liquid fuel is vaporized shortly after the mixture reaches the intake manifold 38 and before the mixture is inducted into the main combustion chamber 22 through the intake valve 42. The fuel-exhaust gas mixture is mixed with air in the intake manifold 38 and then inducted into the main combustion chamber 22.

The total cross-sectional area of the gap 54 between the fuel line tube 48 and the cross-over tube 50 where they join in the exhaust manifold must be sufficiently large so as to permit enough exhaust gases to enter the cross-over tube 50 under all engine conditions so that all fuel entering the intake manifold 38 is vaporized. However, the cross-sectional area must be small enough to prevent overheating of the fuel which will cause ignition prior to introduction into the main cylinder 22. The cross-sectional area of the air gap 54 in the preferred embodiment was found to have an optimum value of 0.076 square inches.

With a suitable cross-sectional area for the gap 54, the temperature of the vaporized fuel under all engine load and speed conditions will be maintained within a rather small range. In this embodiment utilizing diesel fuel, fuel temperature remained very close to 600°F. The reason for such uniformity of temperature will be explained. As more fuel is fed into the main combustion chamber 22 through tube 50, the engine 10 runs at a faster speed. As a result, the exhaust gas temperature increases, and the exhaust gas pressure in the exhaust manifold 36 increases. However, because the size of the gap 54 is constant and because of the presence of more fuel in the cross-over tube 50, the quantity of exhaust gases mixed with the fuel remains nearly constant or decreases slightly. Thus, the amount of heat available for vaporizing fuel increases proportionately with the amount of fuel to be vaporized. The result is that the total heat available per unit volume of fuel remains nearly constant throughout all engine speed and load conditions.

The fuel supply system 12 is similar to that described in U.S. Pat. No. 3,824,965. A variable pressure source indicated generally at 130 delivers to a first fuel distributing manifold 132. Four fuel inductors 134 to be described later lead from manifold 132 to the four pre-chambers 24.

Source 130 also supplies fuel via an adjustable needle valve 144, line 146, and a throttle 148 in the form of an adjustable needle valve, to a second fuel distributing manifold 150. From manifold 150 four of the relatively small diameter branch fuel lines 48 lead to four main chambers 22. Valve 144 serves as a coarse control over fuel flow to the main chambers and throttle 148 provides a fine control. The engine is throttled in operation by moving throttle plunger 149.

Referring now to FIGS. 1 and 3, each inductor 134 includes a check valve 164. One end of each valve 164 is connected by way of a fuel line 166 to manifold 132. Its other end is connected via line 167 to the nozzle 28 extending into a pre-chamber 24.

Each check valve 164 is set to remain closed in response to normal back pressure from the corresponding engine cylinder during the power and compression strokes of the engine. During this time, each valve is backed up by a solid column of substantially incompressible liquid fuel in line 166. Therefore, unlike the case with systems which introduce a carbureted mixture, the valve 164 does not leak during the high pressure segment of the engine cycle.

Valves 164 open in response to the pressure drop across them during the scavenging period when the cylinder pressure, specifically the pre-chamber pressure, falls to a value below that of the fuel pressure. Thus, the timing sequence of fuel injection into the engine pre-chambers is controlled primarily by the engine intake and exhaust valves and/or the pistons without requiring any auxiliary fuel distributing valves or additional timing mechanism.

Refer again to FIG. 3, which shows in more detail the construction of an inductor 134. The line portion 167 between valve 164 and nozzle 28 has a very small diameter (D) in relation to its length (L). That is, the ration D/L should be considerably less than 1. For example, in one embodiment of the invention, the ration D/L is on the order of 0.0003. This produces a pressure drop between manifold 132 and the cylinder pre-chamber which is great enough so that small cycle-to-cycle perturbations in the firing cycle will not significantly affect fuel flow. Moreover, the small diameter line minimizes the standing volume of fuel adjacent to the hot engine cylinder. This minimizes the likelihood of fuel caking and clogging in nozzle 28.

For maximum system performance, valve 164 should positively seal. This condition can be satisfied by a good conventional dilating O-ring check valve employing a spring-leaded ball 190 or plunger when backed up by a column of liquid in the fuel line as mentioned above. The spring bias may be such as to start and stop the flow of fuel into the associated cylinder at the optimum points in the combustion cycle to obtain the required injection period.

Referring again to FIG. 1, fuel source 130 comprises a fuel pump 196 which has its intake 198 connected to a fuel tank 202 and its outlet pressure line 204 connected to manifold 132 and needle valve 144. Line 204 also communicates with tank 202 by way of a line 206, needle valve 208 and a line 210. Valve 208 controls the return flow of fuel to tank 202 and functions as an engine idling adjustment.

Pump 196 is preferably a constant volume pump geared directly to the engine so that it delivers a substantially constant volume of fuel to the pre-chambers and main chambers per engine cycle over all engine speeds. Further, fuel lines 146, 198, 204, 206 and 210 and manifold 132 provide large diameter fluid paths between pump 196 and the inductors 134 and between the pump and fuel lines 48. Also, as noted above, the inductors themselves each have a diameter-to-length ratio which is considerably less than 1. Hence, they may be considered as substantially equivalent to a laminar flow orifice for fluid flow pressure drop considerations. With these constraints, it can be shown that the total volume of fuel delivered to both chambers of each cylinder is not a function of engine speed, but rather is substantially constant per engine cycle.

The adjustment of valves 144 and 208 controls the fuel pressure at the inlets of inductors 134. That is, the closing of valves 144 and 208 reduces the amount of fuel returning to tank 202 and delivered to the main chambers 22 and, hence, increases the fuel pressure at the inlet ends of the pre-chamber inductors. Also, the settings of valves 144 and 208, as well as throttle 148, determine the fuel-air ratio in main chambers 22. Preferably, valve 208 is adjusted so that when throttle 148 is fully closed, sufficient fuel is delivered to each pre-chamber 24 to run the engine 10 at a suitable idling speed. Air from main chamber 22 forms a combustible mixture. During the scavenging portion of the engine cycle, the combustion products in the pre-chamber 24 are drawn out through the main chamber 22.

As the operator opens throttle 148, fuel is fed to the engine main chambers 22 during the intake stroke portions of the engine cycle to form a charge. This charge is ignited when the corresponding piston 34 approximates top dead center by the hot gas jet from the corresponding pre-chamber 24. Combustion in the main chamber charge then provides the primary power output.

Since pump 196 is geared directly to the engine 10, it pumps more fuel as engine speed increases to meet the increased pressure demand. As the engine 10 runs faster, each check valve 164 sees a higher fuel pressure from the pump, but remains open for a shorter period of time. Therefore, assuming a given setting of throttle 148, the amount of fuel injected into each pre-chamber 24 remains substantially constant. As the engine load increases, however, the operator must open throttle 148 to supply additional fuel to the cylinders 22 to maintain the same engine speed. Some of this added fuel is carried over into the pre-chambers 24 along with the air. Normally, this carryover, when added to the unthrottled fuel charge to the pre-chamber 24, would result in an excessive amount of fuel being present there, causing flooding. In the present system, however, this problem is avoided because, as best seen from FIG. 1, when the throttle 148 is opened to increase the amount of fuel fed via line 204 to the main chambers 22, the pressure drops in the branch line leading to manifold 132 serving the pre-chambers 24.

Thus, as the load increases, less fuel is injected into the pre-chambers 24 via manifold 132 to compensate for the increased carryover fuel. As a result, the total amount of fuel mixed with the air in the pre-chambers 24 remains relatively constant, assuring a combustible mixture in the pre-chambers 24 and smooth engine operation over a wide range of engine load and speed regimes.

From the foregoing it can be appreciated that control of both fuel flow rate to the intake manifold and the heat source for vaporizing the fuel proceeds automatically from change in engine load.

Figure 4:
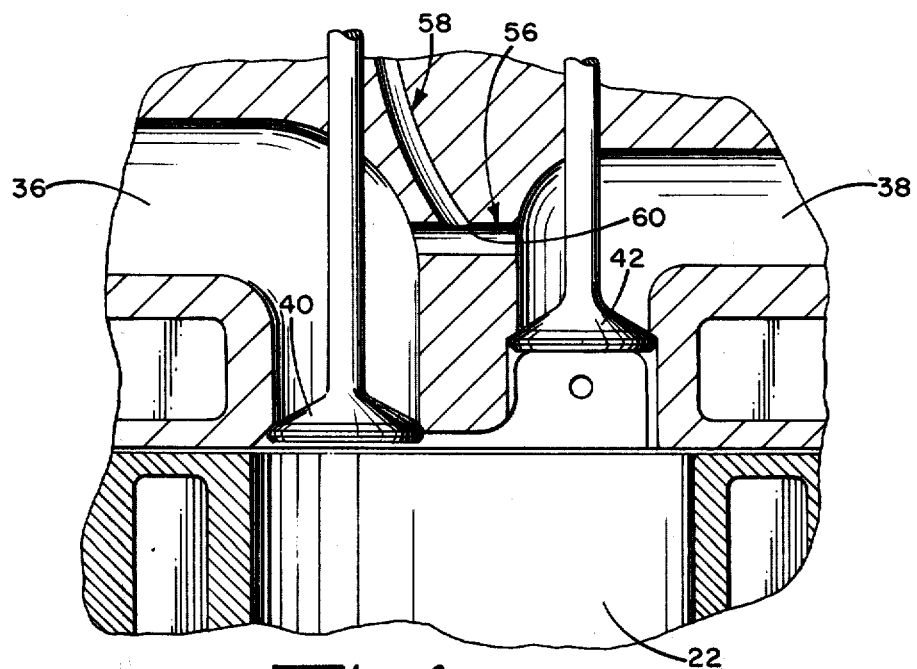
FIG. 4 illustrates an alternative embodiment of the charge forming device.

FIG. 4 depicts a second embodiment of the invention which comprises the same fuel supply system 12 and the same basic engine 10 as described in the first embodiment. In this embodiment, a cross-over tube 56 is formed in partition 37 and extends from the intake manifold 38 to the exhaust manifold 36. A fuel line tube 58 from the fuel supply system 12 enters the wall of the engine and joins the cross-over tube 56 at a junction 60. The fuel line tube 58 and the cross-over tube 56 together provide a single conduit system for the fuel from the fuel supply system 12 to the intake manifold 38 and for mixing the fuel with exhaust gases to vaporize the fuel. The diameter of the cross-over tube 56 must be smaller than that of the tube 50 in the first embodiment, other factors being equal, so that the cross-sectional areas of the gap through which the exhaust gases pass is not too large.

In operation, fuel flows from the fuel supply system 12 through the fuel line tube 58 and flows slowly in a thin stream or in droplets into the cross-over tube 56. There, fuel mixes with the exhaust gases and begins to vaporize as in the first embodiment. Vaporization continues as the mixture enters the intake manifold 38, and is completed shortly thereafter before the mixture is inducted into the main combustion chamber 22. The mixture of vaporized fuel and exhaust gases is then mixed with air and inducted into the main combustion chamber 22 as in the first embodiment.

This invention has been described with reference to various preferred embodiments. It should be understood, however, that modifications may be made by those skilled in the art without departing from the scope of the invention.

What is claimed is:

1. In an internal combustion engine of the stratified charge type having one or more cylinders, each cylinder including a main chamber, a pre-chamber communicating with the main chamber for igniting a charge in said main chamber, and a fuel supply system having a main chamber fuel means for supplying fuel and air to the main chamber as a function of engine load and a pre-chamber fuel means for feeding fuel to the pre-chamber as an inverse function of engine load, the fuel supply system comprising:

an intake passage for receiving fuel and air prior to combustion in said main chamber;

an exhaust passage in close proximity to said intake passage for accepting exhaust gases from said main chamber and characterized by higher pressures than those of said intake passage;

wall means directly separating said intake passage from said exhaust passage;

fuel line means communicating with a fuel source means for transporting fuel from said fuel source means;

a fuel pump for continuously maintaining a fuel supply pressure substantially constant with respect to engine crank angle and above air supply pressure to supply fuel directly from said fuel source means to said fuel line means; and a cross-over tube penetrating said wall means and communicating at a first end with said intake passage and communicating at a second end with said exhaust passage for permitting a flow of exhaust gases from said exhaust passage directly to said intake passage, said cross-over tube forming a junction with said fuel line means to thereby form a single conduit means from said fuel source means to said intake passage, whereby said cross-over tube receives fuel from said fuel line means and permits such fuel to mix with said exhaust gases within said cross-over tube for vaporization by heat transferred from said exhaust gases.

2. An internal combustion engine fuel system as defined in claim 1 wherein said junction comprises means joining said second end of said cross-over tube with said fuel line means within said exhaust passage, and means forming openings communicating with said cross-over tube within said exhaust passage for admitting said flow of hot exhaust gases from said exhaust passage into said cross-over tube.

3. An internal combustion engine fuel system as defined in claim 2 wherein said cross-over tube circumscribes and overlaps an end of said fuel line means within said exhaust passage for defining said opening forming means.

4. An internal combustion engine fuel system as defined in claim 3 further comprising constriction means formed at said junction for admitting sufficient exhaust gases to vaporize all fuel introduced into said cross-over tube and simultaneously damping load induced pressure drop variations across said cross-over tube and thereby damping variations in the rate of said flow of exhaust gases through said cross-over tube, whereby the flow rates of both fuel and exhaust gases through said cross-over tube are related to each other as a function of engine load to establish a temperature level in said cross-over tube, said temperature level being subject only to variations damped around a predetermined temperature level.

5. An internal combustion engine fuel system as defined in claim 1 wherein said junction between said fuel line means and said cross-over tube is located within said wall means at a point between said exhaust passage and said intake passage.

6. An internal combustion engine fuel system as defined in claim 5 further comprising constriction means for admitting sufficient exhaust gases to vaporize fuel introduced into said cross-over tube and simultaneously damping load induced pressure drop variations across said cross-over tube and thereby damping variations in the rate of said flow of exhaust gases through said cross-over tube, whereby the flow rates of both fuel and exhaust gases through said cross-over tube are related to each other as a function of engine load to establish a temperature level in said cross-over tube, said temperature level being subject only to variations damped around a predetermined temperature level.

7. An internal combustion engine fuel system as defined in claim 1 further comprising constriction means formed in said cross-over tube for passing sufficient exhaust gases to produce vaporization of substantially all fuel introduced into said cross-over tube and simultaneously damping load induced pressure drop variations across said cross-over tube to damp variations in the rate of said flow of exhaust gases through said wall means, whereby the flow rates of both fuel and exhaust gases through said cross-over tube are related to each other as a function of engine load to establish a temperature level in said cross-over tube, said temperature level being subject only to variations damped around a predetermined temperature level.

8. In an internal combustion engine of the stratified charge type having one or more cylinders, each including a main chamber, a pre-chamber communicating with the main chamber for igniting a charge in said main chamber, and a fuel supply system having a main chamber fuel means for supplying fuel and air to the main chamber as a function of engine load and a pre-chamber fuel means for feeding fuel to the pre-chamber as an inverse function of engine load, a method of vaporizing fuel prior to combustion in said main chamber comprising the steps of:

introducing primary exhaust gases from said main chamber into an exhaust passage at a temperature varying as an increasing function of engine load;

pumping fuel from a fuel supply source into a fuel line means as an increasing function of engine load;

introducing said fuel in a trickle into a continuously open cross-over tube penetrating a wall means separating an intake passage from said exhaust passage as an increasing function of engine load;

maintaining a higher characteristic pressure in said exhaust passage than in said intake passage, thereby inducing a flow of exhaust gases from said exhasut passage through said cross-over tube into said intake passage, said pressure differential varying as an increasing function of engine load;

mixing said exhaust gases with said fuel in said cross-over tube;

vaporizing said fuel by means of heat transferred from said exhaust gases to said fuel;

transporting said fuel and exhaust mixture through said cross-over tube into said intake passage by means of said flow of exhaust gases therethrough;

regulating said flow of exhaust gases through said cross-over tube by a passage of a constant predetermined size formed thereby for permitting a sufficient flow therethrough of exhaust gases to vaporize fuel introduced into said cross-over tube and for modulating about a predetermined temperature the temperature variation of said mixture of fuel and exhaust gases; and inducting said mixture of fuel and exhaust gases from said intake passage into said main combustion chamber.

* * * * *